3,497,345
TITANIUM DIOXIDE COATED
PESTICIDAL GRANULE
Werner Duyfjes, Amsterdam, Netherlands, assignor, by mesne assignments, to U.S. Philips Corporation, New York, N.Y., a corporation of Delaware
No Drawing. Filed Mar. 7, 1968, Ser. No. 711,173
Claims priority, application Netherlands, Mar. 8, 1967, 6703610
Int. Cl. A01n 17/00
U.S. Cl. 71—105                              5 Claims

ABSTRACT OF THE DISCLOSURE

Pesticidal granules containing titanium dioxide to prevent disintegration while in storage as well as improving visibility of granules.

---

This invention relates to granules of active compounds, such as pesticidal compounds and artificial manures, which are used in agriculture and horticulture.

Pesticidal compounds are to be understood to means compounds such as, for example, herbicidal, acaricidal, insecticidal and fungicidal compounds which are used in the control of harmful organisms.

Especially the pesticidal granule is a granular form of formulation of pesticides which has aroused great interest these last years, said pesticides being strewn over the ground or over the water and frequently distintegrating by the action of water.

Granules vary in diameter between approximately 0.02 cm. and 0.5 cm. and may contain, in addition to the active compound, solid inert carrier material, binders and possibly surface-active substances, lubricants and stabilising agents.

Inert solid carrier materials which are frequently used in granules are, for example, silicate minerals, such as kaoline, bentonite, attapulgite and pumice, and also minerals on a carbonate basis, such as marble, marl and dolomite. In certain cases use is made of organic carrier materials such as, for example, particles of nutshells, pits of fruit and coffee-grounds. The binders facilitate or bring about the adhesion of the active constituent on or within the carrier material. Suitable means which can be used as such are, for example, albumins, carbohydrates, lignine sulphonates, starch hydrolysates, starch, polysaccharides, polymetacrylates, polyethylenepolysulphides and metal sulphonates. The addition of surface-active substances such as sulphonated fatty alcohols, alkylphenolpolyglycolethers, alkylarylsulphonates and quaternary ammonium compounds and lubricants, such as silicon compounds, for example synthetic calcium silicate, causes the binder to contact the active substance and the carrier material more rapidly and more evenly, resulting in a better distribution of the active substance over the carrier material.

The stabilising agents serve to inhibit or delay any disintegration of the active compound and hence a decline in the activity thereof. Suitable stabilising agents which can be mentioned are, for example, epichlorohydrine and hexamethylenetetramine.

When strewing the granules over the surface to be treated it is important to prevent both an overdosage which does not pay and an underdosage which does not produce the desired effect. Since, during strewing, the spread of the granules and the question whether the ground is satisfactorily covered with the granules is frequently judged visually, it is desirable to make the granules clearly visible.

It is possible to obtain granules with a white colour which is well visible against the ground by using white or substantially white carrier materials (such as, for example, kaoline or white Norwegian dolomite). However, such a granular product is not interesting in the economic respect because of the comparatively high cost of the carrier substance used in it.

Another factor which is important for an advantageous use of granular compositions in agriculture and horticulture is the extent of disintegration of the granules.

During the storage of granular compositions the granules will disintegrate into small particles to a greater or lesser extent as a function of the storage conditions prevailing such as temperature and relative humidity of the ambient air, and of the composition of the granules, while further disintegration will occur during transport and especially during the transport in the mechanical dosing equipment.

The presence of small particles in a granular composition has the disadvantage that, when strewing the composition, these particles which have a low falling speed, keep hanging above the region to be treated a long time or contaminate surrounding regions through air flows whereby dangerous situations may occur, especially if the active constituent of the composition is toxic. Further, the cloud of small particles of the composition causes much trouble in further strewing the granules, since the skin, the eyes, and also the nasal cavity and pharynx of the operating staff are irritated by the said particles.

The applicant has also found that in the conventional granular compositions often insufficient attention has been paid to the inhibition of sorption or desorption of constituents from the surroundings to the granule or from the granule to the surroundings. Especially in granules containing volatile constituents, such as water, and volatile active substances, such as 2,6-dichlorobenzonitrile, desorption of these constituents from the granule plays an important part and gives rise to a rapid decline in the quality and/or activity of the granules.

The applicant has now found that it is possible in a simple manner to obtain granules which have a white colour, which disintegrate to little or no extent and which exhibit a minimum exchange of material with the surroundings during storage.

The invention consists in a granule the core of which is an active compound or a combination of an active compound with solid inert carrier material, binders and possibly surface-active substances, lubricants and stabilising agents, and it is characterized in that the core is surrounded by one layer which predominantly consists of $TiO_2$.

Granules are known which are surrounded by a resin layer and consequently are active for a longer period and can also better resist disintegration.

In manufacturing such granules a liquid resin is mixed with granules and subsequently, before the resin layer surrounding the granules has dried, a powdered pigment, resin or other pulverulent compound used in agriculture is added to the composition in order to prevent agglomeration of the individual granules.

The granules manufactured by this known process may contain pigment particles which form a second layer around the resin layer previously mentioned.

The granule according to the invention is distinguished from the above-mentioned granule inter alia in that an outer layer of $TiO_2$ is directly bonded to the surface of the granule without using a resin-like intermediate layer.

The granule according to the invention may be manufactured by mixing a granular active compound with finely-divided $TiO_2$ or by manufacturing a granule in known manner from the previously mentioned constituents (active compound, carrier material, binders and possibly surface-active substances, lubricants and stabilising agents) and mixing this granule with finely-divided $TiO_2$. Granules of pesticidal compounds may be obtained, for example, by impregnating granular carrier material with an active substance, possibly with the use of binders and surface-active materials. Also, powdered carrier material may be mixed with the active substance, binders and possibly surface-active substances, lubricants and stabilising agents and this mixture may be compressed, possibly after adding a little water, whereby the binder liquefies due to the heat evolved. The rolled product is then smashed to form granules in a disintegrator, whereafter the granulated product is sieved. It is also possible, after mixing the active substance with the carrier materials, the binders and possibly with lubricants and surface-active substances, to add water or an other liquid to the said mixture so as to obtain a paste which is extruded and cut to granules after drying.

The intrinsic adhesion of the finely-divided $TiO_2$ is such that comparatively very thick layers can be applied to the granules. However, it is interesting in economic respect to add so much $TiO_2$ to a granular composition that a mean layer thickness between $1\mu$ and $500\mu$ is obtained and the granules contain between 1 and 25% by weight of $TiO_2$.

It is also possible to manufacture the granule according to the invention by mixing a granular composition with a dispersion of finely-divided $TiO_2$ in water or in an organic liquid. Organic liquids which may be used for this purpose are, for example, ketones, glycols, glycolethers, alcohols and hydrocarbons. In an economically advantageous method of manufacturing granules according to the invention the dispersing agent used is oil.

If granules of very arbitrary shape are treated with a dispersion of finely-divided $TiO_2$, it is preferable to add a film-producing agent, such as cellulose acetate or a polyvinyl alcohol, to the dispersion of $TiO_2$ in the liquid, since the granules are thus better rounded and hence crumble through external forces to a lesser extent.

During the treatment of a granular composition with finely-divided $TiO_2$, the small particles present in the composition are either agglomerated into larger particles by the $TiO_2$ or bonded to the larger granules due to the $TiO_2$ layer being formed. It has also been found that granules according to the invention have a high resistivity to disintegration. This is caused substantially by the strong intrinsic adhesion of $TiO_2$ and the resulting strong cohesion of the individual particles in the $TiO_2$ layer. This strong cohesion ensures satisfactory resistivity to external forces acting on the granules. Especially if the $TiO_2$ particles are of small size, for example $<1\mu$, the intrinsic adhesion is great and a dense stacking of the particles in the $TiO_2$ layer is also obtained. Consequently a minimum exchange of material occurs between the outer part of the granule and the surroundings through the $TiO_2$ layer and expansion and shrinkage of the granule due to sorption or desorption of substances from or into the surroundings through the $TiO_2$ layer is inhibited, thus preventing premature disintegration of the granule. Since the active compound does not migrate from the granule nor disintegrates due to external influences, the durability of the granule with regard to the biological activity is also improved.

Pesticidal compounds which can be used in the granule according to the invention are inter alia: monuron, diuron, linuron, propazine, simazine, 2,6 - dichlorobenzamide, heptachlorine, chlorodane, HCH, 4-chloropyridine-N-oxide, 2,6-dichrobenzonitrile and organic compounds of quadrivalent tin, such as triphenyltin, hydroxide, triphenyltin chloride and triphenyltin acetate. In a preferred form of the granule according to the invention, 2,6-dichlorobenzonitrile is used as the active substance.

When the granule according to the invention is used for the control of harmful organisms and/or the stimulation of the desired vegetation it is important that the active constituent can be liberated from the form of the formulation, in this case a granule the outer layer of which consists of $TiO_2$ particles. The $TiO_2$ layer of the granule according to the invention is permeable to moisture more or less as a function of the fineness of the $TiO_2$ particles and the thickness of the layer so that, when strewn on the ground, the $TiO_2$ layer disintegrates more or less rapidly due to the moisture present in the ground or through moisture from the atmosphere (rain), thus enabling to control the liberation of the active constituent and hence the period of activity of the granule.

EXAMPLES

(I)

84 kgs. of ground dolomite (possibly marl), 5 kgs. of powdered sulphite lye, 1 kg. of sodium salt of sulphomated fatty alcohols and 10 kgs. of ground 2,6-dichlorobenzonitrile are mixed in a horizontal mixer. After this mixture was completely homogeneous, 2 litres of water are clouded in the powder while stirring, followed by mixing for another few minutes.

The powder thus wetted with water is now introduced into a so-called "compactor" in which the powder is pressed under high pressure to form "strips" or "plates."

During this process much heat is evolved so that part of the water evaporates.

The "strips" or "plates" become very hard after cooling and may then be passed through a smashing machine which smashes the strips to a considerable proportion to form granules.

These granules are separated in the desired fractions by a sieving machine operating continuously.

The powdery proportion which is too fine is fed back to the mixing equipment, whereas the proportion which is too coarse is again smashed via the smashing machine, from which the sieving machine ultimately separates again the desired granule fraction.

2% by weight of finely-divided $TiO_2$ are added to the resulting granular composition in a mixing drum. After mixing, the resulting product is sieved, in order that any $TiO_2$ agglomerates not attached to the granules are removed from the granular composition.

(II)

In the manner described in Example I, carrier material (dolomite), binder (sulphite layer), active compound (2,6-dichlorobenzonitrile) and a surface-active substance (sodium salt of sulphated fatty alcohols) are mixed and then worked up into granules. 6 litres of a 30% $TiO_2$ dispersion in glycolether are added to the resulting granular composition. The product obtained is sieved and dried in order to remove the residual glycol ether.

What is claimed is:
1. A pesticidal granule comprising a core containing, in a pesticidally effective amount, a pesticidally active compound and a coating for said core for providing a white color to said granule and for preventing disintegration of said granule while in storage, said coating consisting essentially of titanium dioxide.

2. The granule of claim 1 wherein the pesticidally active compound is 2,6-dichlorobenzonitrile.

3. The granule of claim 1 wherein the particle sizes of the $TiO_2$ present in the coating are less than $1\mu$ in diameter.

4. The granule of claim 1 wherein the average thickness of the $TiO_2$ layer is between $1\mu$ and $500\mu$.

5. The granule of claim 1 wherein between about 1 and 25% by weight of $TiO_2$ is present.

References Cited

UNITED STATES PATENTS

| | | | |
|---|---|---|---|
| 3,107,150 | 10/1963 | Angerman | 106—300 |
| 3,074,845 | 1/1963 | Geary | 167—42 |
| 3,083,089 | 3/1963 | Renner. | |
| 3,037,854 | 6/1962 | Kenney | 71—120 |
| 3,027,248 | 5/1962 | Koopman | 71—105 |
| 2,992,090 | 6/1961 | Littler | 71—119 |

LEWIS GOTTS, Primary Examiner

CATHERINE L. MILLS, Assistant Examiner

U.S. Cl. X.R.

71—79; 424—16